United States Patent Office 2,923,633
Patented Feb. 2, 1960

2,923,633

RAIN REPELLENTS FOR WINDSHIELDS

Donald F. Stedman, Ottawa, Ontario, Canada, assignor to National Research Council, Ottawa, Ontario, Canada, a body corporate of Canada No Drawing. Application June 21, 1957
Serial No. 667,275

6 Claims. (Cl. 106—13)

This invention relates to improved rain or water repellent compositions which are particularly useful on windshields of rapidly moving vehicles.

In applicant's prior United States Patents 2,612,458 and 2,777,772 there is disclosed a rain repellent consisting essentially of substituted polysilicanes having at least one Si—Si linkage and containing only carbon, hydrogen and silicon. Such compounds are applied to a windshield as an adherent film by rubbing with a friction agent. This film of substituted polysilicane functions well at speeds up to 450 m.p.h. and at speeds of 650 m.p.h. or more with the assistance of the air blast in removing the effect of rain at such high speeds.

In view of the importance of maintaining complete clarity of vision in windshields travelling at high speeds, further intensive investigation has shown additional improvement by the invention now to be described.

It has been found that substantial improvement is effected by incorporating a small amount of spontaneous chemical reactivity in the substituted polysilicane molecules, so that with friction the molecules are more reactable and build up more substantial repellent films on the window. This makes it possible to provide a fully effective repellent with these films alone and unnecessary to apply a wax coating over the adherent film.

This chemical reactivity is provided by incorporating in the polysilicanes, more recently sometimes designated as polysilanes, previously used, a few alkoxy groups instead of all alkyl groups. Best results are obtained if the alkyl groups, so modified, are the smallest in the molecules, so that the larger alkyl and silicon groups will surround these alkoxy groups and hinder their spontaneous reactivity to moisture, by what is termed steric hindrance. For the same reason the water repellence of the product is lowered very little by the less repellent alkoxy groups, since they are within the molecule and not much exposed to contact with water. If only a few alkoxy groups are introduced into the molecule, the added oxygen atoms joining alkyl to silicon groups are of a silico-ether type and are relatively stable to moisture, whereas if many oxygen atoms are so used, these are chemically similar to those in ethyl orthosilicate and are quite reactive to atmospheric moisture. At least one alkoxy group is necessary but not more than half the number of alkyl or aryl groups in the polysilicane should be so replaced with alkoxy groups. When the term alkyl is used hereafter and in the claims in relation to the now known polysilicanes it is intended to include aryl.

The polysilicanes having the direct Si—Si linkage and alkyl substituents are represented as follows:

The disilicane—

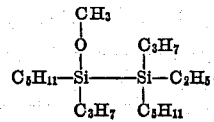

The trisilicane—

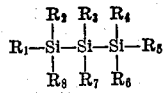

when $R_1$ to $R_8$ are alkyl radicals. The chains may also be longer than represented by three silicon atoms.

The analogous new compounds containing substituted alkoxy substituent are represented as follows:

The alkoxy substituted disilicane

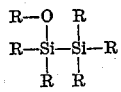

The alkoxy substituted trisilicane

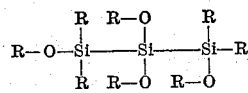

In preparing the new compounds the alkyl groups are added to the molecule by reaction of Grignard reagent with polysilicon chlorides, as previously described in Patent 2,612,456, but the step is included of reacting alcohols in partial stoichiometric quantities at some stage of the synthesis in order to obtain the mixed molecular configuration.

In the synthesis the partial alkylation may be done first, followed by addition of alcohol to the reaction mixture, conveniently in amount adequate to form a mush with the salts and allow decantation of the supernatant solvent and product, followed by addition of alcohol to complete the reaction when the HCl formed is driven off. However it is more convenient to react the polysilicon chlorides with an alcohol first and after refluxing to drive off the HCl add the alkyl Grignard reagent to complete the synthesis. Alcohol is then added to make a mush of the salt and after decantation small amounts of alcohol are added to react with the trace of chlorine left in the product.

The method is illustrated as follows, 21 cc. of methanol diluted with 160 cc. of benzene was added to 90 cc. of disilicon hexachloride in admixture with 200 cc. of benzene. The resulting HCl was refluxed off, replacing one chlorine atom with the methoxy group. Two chlorine equivalents of amyl and two equivalents of propyl Grignard reagent were then added. The mixture was kept warm at 60–80° C. for about ½ hour to complete the reaction and two equivalents (one in excess) of ethyl Grignard reagent were added and the mixture heated to 65° C. for about 16 hours. Ethanol and an equal amount of methanol were added to make a mush of the salt. The solvent was decanted and evaporated. A small amount of methanol was added to the product and refluxed to remove reactive chlorine. A trace of unreactive chlorine may remain in the product, but since it has little or no deleterious effect it is not necessary to continue the extraction till every trace is removed. However if it is desired to remove all chlorine it may be done by the above method by methanol addition and bubbling a dry gas, such as nitrogen through the mass.

The product so produced is represented by the following formula,

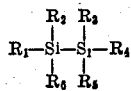

but it will be understood in this specification and also in the claims, that the individual alkyl or alkoxy groups may be attached to the silicon atoms in any location.

The product is improved by including in the disilicon hexachloride up to about 30% of higher silicon chlorides as illustrated in the following examples:

Four equivalents of a Grignard reagent were made by refluxing 2.3 cc. propyl bromide, 2.8 cc. amyl bromide, 7 cc. ether, 20 cc. benzene and 1.6 grams magnesium for 17 hours.

A. 2 cc. of silicon hexachloride, containing 20% of trisilicon octachloride, was diluted with 20 cc. benzene and the above Grignard reagent added with stirring under reflux for one half hour. After cooling 11 cc. methanol containing 20% of water was added and shaken to coagulate the salt layer which was separated, washed twice with a mixture of equal parts of benzene and methanol. The solvent layers were collected, dried with granular calcium chloride and the alkylated product decanted and evaporated to about 12 cc. 0.3 g. of magnesium was dissolved in 5 cc. of methanol and added to the product. The mixture was refluxed a few minutes to cause the magnesium methylate to react. 7 cc. benzene and 3 cc. of methanol containing 20% water were added. The solvent was separated from the salt and the salt washed twice with benzene. The collected solvent layers were dried with calcium chloride, evaporated to 130° C. and centrifuged clear giving a pale yellow, low viscosity oil. The product is di-methoxy-di-propyl-di-amyl polysilicane.

The substituted disilicane portion of the product may be represented,

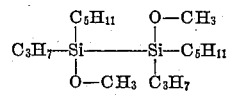

The trisilicane is proportionately substituted with the individual alkyl and alkoxy groups arranged at random.

B. 2 cc. of purified hexachloride, containing less than 5% of the octachloride, was reacted with amyl and propyl Grignard reagents as in the previous example. The resulting mixture was extracted successively with 7 cc. methanol, 1 cc. methanol in 4 cc. benzene, 4 cc. benzene, each extraction being refluxed for a few minutes. The whole extract was evaporated to 120° C., cooled and decanted from a trace of salt which was washed with benzene. 1 cc. of methanol was added followed by evaporation to a temperature of 130° C. This addition of methanol and evaporation was repeated twice. The oil was then treated with 1 cc. of methanol and nitrogen was bubbled through the mixture to eliminate the hydrochloric acid. This gave the di-methoxy-di-propyl-diamyl substituted polysilicane.

C. To 10 cc. of silicon hexachloride diluted with 20 cc. of pure dry benzene was added with vigorous stirring 2.33 cc. of methanol diluted with 20 cc. benzene and the mixture refluxed for 15 minutes under a vertical air condenser tube to eliminate hydrochloric acid. To this was added with stirring Grignard reagent from 14.75 cc. amyl bromide, 12 cc. butyl bromide, 35 cc. ether, 40 cc. benzene and 7 grams magnesium refluxed for 17 hours. After refluxing for ½ hour excess Grignard reagent from 1.3 g. ethyl bromide, 18 cc. ether, 20 cc. benzene and 3.5 g. magnesium, refluxed 12 hours, was added and after spontaneous reflux ceased the whole was sealed in a flask which was heated at 65° C. for 18 hours. After removing from the oven the flask was placed under reflux, 30 cc. methanol added and shaken to coagulate the salt. The solvent was decanted and the salt washed with 20 cc. boiling benzene. The collected solutions were evaporated to 90° C. and decanted from the small solid residue and evaporated to 105° C. After removing from heat 5 cc. methanol was added and evaporation continued to 115° C. The oil was again transferred to a clean vessel and the residue washed with benzene. Three successive additions of 2 cc. methanol were then made taking each evaporation to 122°, 180° and 180° C. on the successive treatments. This produced the monomethoxy mono-ethyl di-butyl di-amyl substituted polysilicane.

It will be recognized that any of the alkyl or aryl substituted polysilicanes of my prior patent may be modified by the similar use of a small proportion of alkoxy groups as herein described. The specific syntheses above given are merely illustrations of known procedures for producing compounds of this class, and larger alkyl and alkoxy groups suitable for many repellent applications, especially at lower speeds, may be introduced into the molecule by equivalent procedures. The specific examples given were selected as giving products most suitable for high speed aircraft, the methoxy group giving particularly high adhesion and high strength to the repellent film. Groups larger than amyl are not as beneficial at very high air speeds. Groups as large as heptyl, however, are very satisfactory at rather lower speeds, e.g. 400 m.p.h. or lower and naturally give greater yields of the resulting oil product.

In applying the new alkoxy-alkyl substituted polysilicanes carbon black and/or rouge is mixed with them to form a paste for application with rubbing to the windshield. 10 to 50% of carbon black or 10 to 100% of rouge may be added, or both, as in the previously disclosed method for producing adherent repellent films from the substituted polysilicanes.

What is claimed is:

1. As a rain repellent for transparent windows, an alkyl polysilicane containing at least one Si—Si linkage represented by the formula

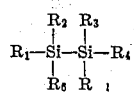

in which $R_1$–$R_6$ are alkyl groups, at least one but not more than one half the akyl groups being replaced with alkoxy groups, in admixture with a friction agent being at least one of a group consisting of carbon black and rouge.

2. As a rain repellent for transparent windows, a polysilicane consisting of a plurality of Si—Si linkages having a plurality of directly attached alkyl groups each having more than 1 and not more than 7 carbon atoms, and a methoxy group, in admixture with a friction agent selected from the group consisting of carbon black and rouge.

3. As a rain repellent for transparent windows, a trisilicane represented by the formula,

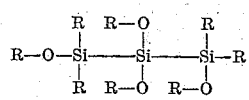

where R is an alkyl group and R—O an alkoxy group, in admixture with a friction agent being at least one of a group consisting of carbon black and rouge.

4. A rain repellent for transparent windows consisting essentially of di-methoxy-di-propyl-di-amyl polysilicane, in admixture with a friction agent being at least one of a group consisting of carbon black and rouge.

5. A rain repellent for transparent windows consisting essentially of mono-methoxy-mono-ethyl-di-butyl-di-amyl polysilicane, in admixture with a friction agent being at least one of a group consisting of carbon black and rouge.

6. A rain repellent as defined in claim 1 in which the alkoxy groups have fewer carbon atoms than the alkyl groups.

(References on following page)

References Cited in the file of this patent

UNITED STATES PATENTS

| | | |
|---|---|---|
| 2,507,502 | Goodwin | May 16, 1950 |
| 2,507,512 | Goodwin | May 16, 1950 |
| 2,507,520 | Goodwin | May 16, 1950 |
| 2,612,458 | Stedman | Sept. 30, 1952 |
| 2,612,511 | Orkin | Sept. 30, 1952 |
| 2,706,724 | Bass | Apr. 19, 1955 |
| 2,777,772 | Stedman | Sept. 15, 1957 |
| 2,881,197 | Kuriyagawa et al. | Apr. 7, 1959 |

FOREIGN PATENTS

| | | |
|---|---|---|
| 7,223 | Japan | Nov. 4, 1954 |

OTHER REFERENCES

Gilman et al.: "Jour. Amer. Chem. Soc.," vol. 75 (1953), pp. 1250-2.

Kumada et al.: "Jour. Org. Chem.," vol. 21 (1956), pp. 1264-8.